United States Patent [19]

Lemelson

[11] Patent Number: 4,488,370
[45] Date of Patent: Dec. 18, 1984

[54] WEAPON CONTROL SYSTEM AND METHOD

[76] Inventor: Jerome H. Lemelson, 85 Rector St., Metuchen, N.J. 08840

[21] Appl. No.: 352,712

[22] Filed: Feb. 26, 1982

Related U.S. Application Data

[63] Continuation-in-part of Ser. No. 121,894, Feb. 15, 1980, Pat. No. 4,354,189, which is a continuation of Ser. No. 849,785, Nov. 9, 1977, Pat. No. 4,189,712.

[51] Int. Cl.³ .............................................. F41C 17/08
[52] U.S. Cl. ................................... 42/70 R; 42/1 LP
[58] Field of Search ............... 42/70 R, 1 MH, 1 LP

[56] References Cited

U.S. PATENT DOCUMENTS

| 4,003,152 | 1/1977 | Barker et al. | 42/70 R |
| 4,154,014 | 5/1979 | Smith | 42/70 R |
| 4,354,189 | 10/1982 | Lemelson | 340/543 |

Primary Examiner—Harold J. Tudor
Assistant Examiner—Ted L. Parr

[57] ABSTRACT

A system and method are provided for controlling the operation of a weapon, such as a hand gun, to prevent it from being accidentally operated or operated by a person who is not the owner of the weapon or someone who is not authorized to use the weapon. In one form, a microminiature electronic circuit is provided within the weapon and is operable to generate a radio frequency energy field in the vicinity of the trigger for the weapon. An electrical device, such as an inductor, is supported on the wrist or finger of the person owning the gun and serves as an absorber of some of the field energy which energy absorption is detected by a suitable detector forming part of the electronic circuit whereupon a control signal is generated for controlling a motor or solenoid to operate a stop or latch in a manner to disengage an operating portion of the weapon, such as the trigger or trigger mechanism and allow such mechanism to be manually operated. In another form, a passive electronic circuit worn on the arm or finger of the person owning or authorized to use the weapon, becomes activated by field energy generated by the electronic circuit supported in the weapon and generates a signal or code which is short wave transmitted to the weapons electronic circuit causing a control signal to be generated which operates a motor or solenoid which drives a latch or stop to a position whereby the weapon may be operated.

4 Claims, 7 Drawing Figures

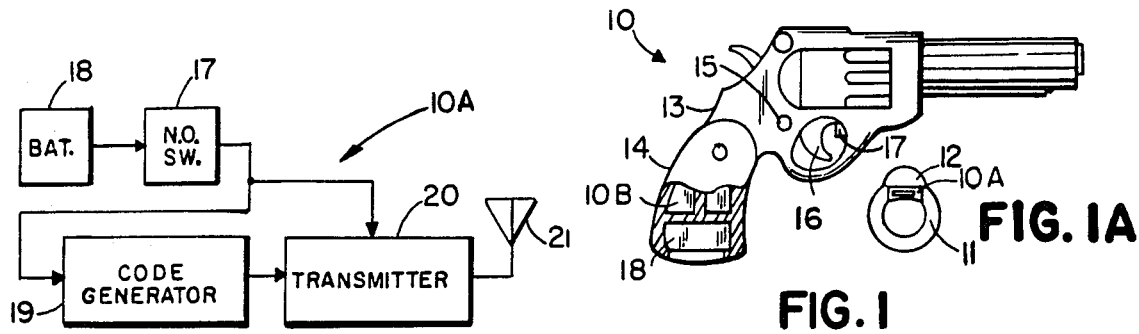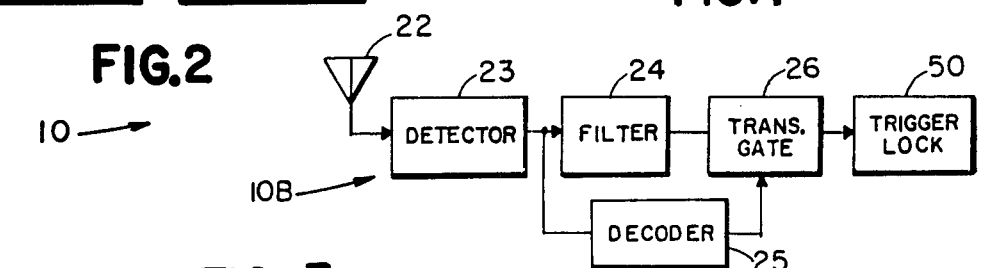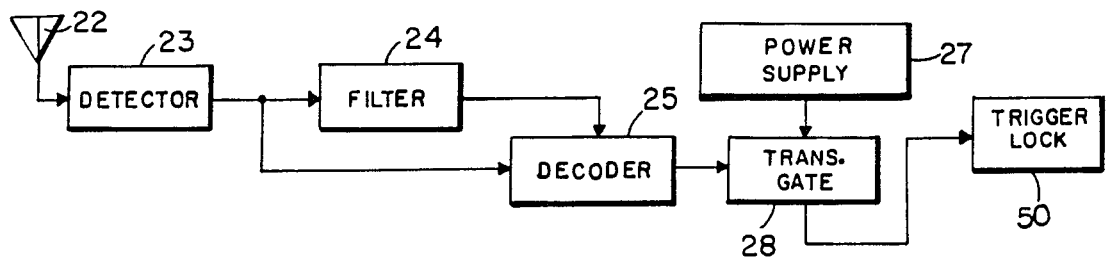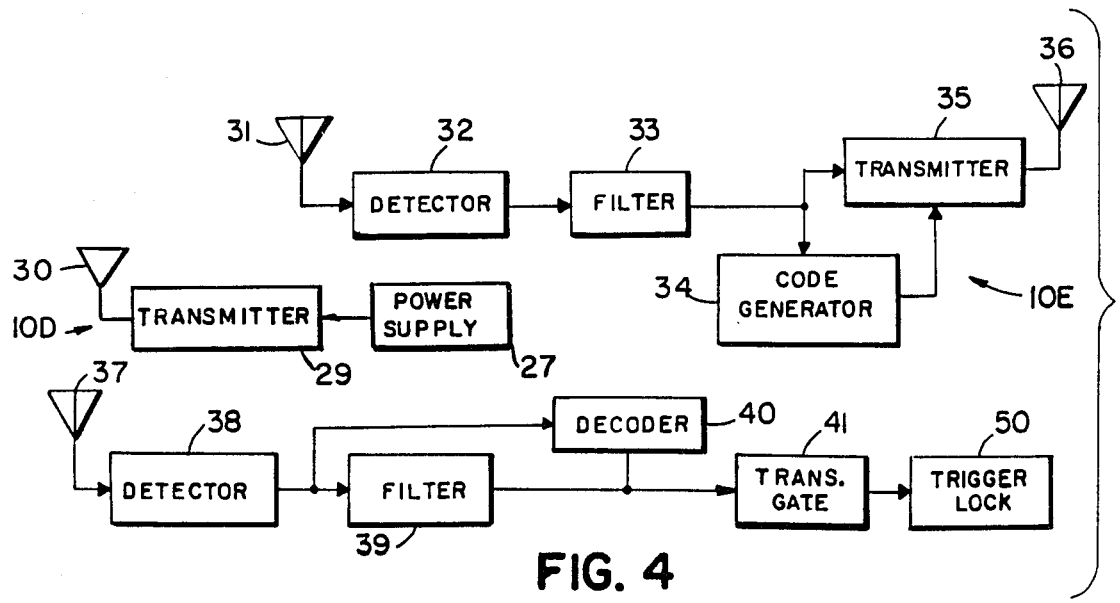

WEAPON CONTROL SYSTEM AND METHOD

RELATED APPLICATIONS

This is a continuation-in-part of Ser. No. 121,894 filed Feb. 15, 1980 now U.S. Pat. No. 4,354,189, which is a continuation of Ser. No. 849,785 filed Nov. 9, 1977, now U.S. Pat. No. 4,189,712.

SUMMARY OF THE INVENTION

This invention relates to a system and method for enabling the operation of a weapon by hand only when an electronic circuit or electrical device is in the vicinity of the weapon so that if a person who is not authorized to use the weapon attempts to do so, the weapon will not operate. While primarily intended for use to decrease the hazards associated with hand guns, the system and method may be employed to enable the operation of hazardous devices such as hand and machine tools and other devices wherein only authorized personnel may operate same.

Various weapons and devices may be operated by anyone having access thereto and capable of using their hands or fingers to effect such operation. As a result, weapons such as hand guns are frequently operated or discharged by children and criminals or other persons unauthorized to do so, resulting in many injuries and deaths.

The instant invention requires the application of special electrical or electronic devices to the vicinity of an electronic circuit, preferably supported by a weapon near where it is grasped by hand to effect its operation. As a result, the weapon may only be operated by a person containing such electrical or electronic device or key which may be housed in a finger ring, wristband supported housing or wrist watch. Military personnel or police possessing such weapon control means may generally be assured that an unauthorized person will not be able to operate the weapon or that the weapon will self discharge by accident such as when it is accidentally dropped.

Accordingly it is a primary object of this invention to provide a new and improved apparatus and method for controlling the operation of weapons.

Another object is to provide a simple, inexpensive and lightweight control system for a weapon, such as a hand gun.

Another object is to provide a simple, inexpensive and small control unit and method for controlling the operation of a variety of hazardous weapons, such as guns, grenades rocket launchers, canon and other weapons to prevent their accidental discharge and to permit them to be operated only by persons authorized to do so and holding special electronic means to permit such operation.

Another object is to provide a weapon operation enabling system and method which is relatively simple in construction, inexpensive to produce and requires little maintenance.

With the above and such other objects in view as may hereinafter more fully appear, the invention consists of the novel constructions, combinations and arrangements of parts as will be more fully described and illustrated in the accompanying drawings, but it is to be understood that variations, changes and modifications may be resorted to which fall within the scope of the invention as claimed:

In the Drawings:

FIG. 1 is a side view of a weapon in the form of a pistol having a portion of its stock broken away for clarity and a finger ring to be worn by the user of the weapon to enable its operation when the ring and pistol are closely disposed such as when the pistol is held by the hand supporting the ring.

FIG. 2 is a schematic diagram of electronic circuit components supported by the weapon and ring of FIG. 1 and defining a first control system for enabling operation of the weapon.

FIG. 3 is a schematic diagram of a modified form of the electronic control system of FIG. 2.

FIG. 4 is a schematic diagram of yet another embodiment of the invention in which operating current for the control system which enables operation of a hand held weapon is provided solely by means of a source of electrical energy supported by the weapon thereby preventing operation of the weapon when such source of electric energy or battery is removed from the weapon but permitting the hand mounted device or electronic circuit in a finger ring or wrist band to be used to enable other weapons to be enabled to operate.

Figure 5:
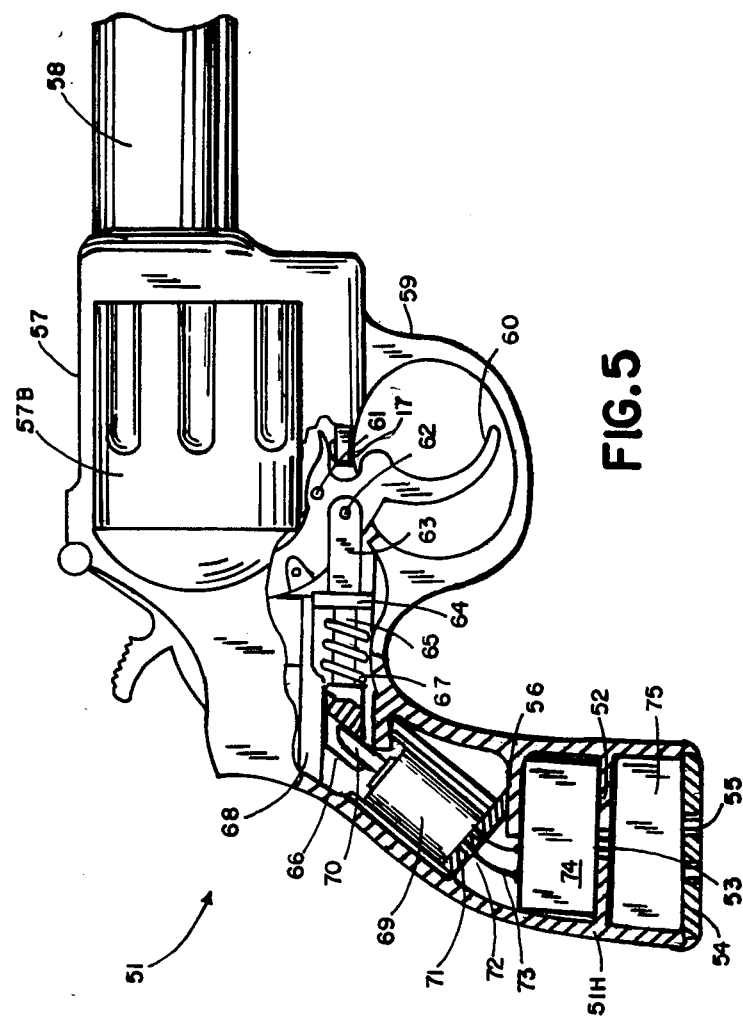

FIG. 5 is a partial side view with parts broken away for clarity and sectioned, of a hand weapon in the form of a pistol with trigger and firing disabling means in the form of a solenoid operated stop which normally prevents the gun from being fired until the solenoid is operated.

Figure 6:
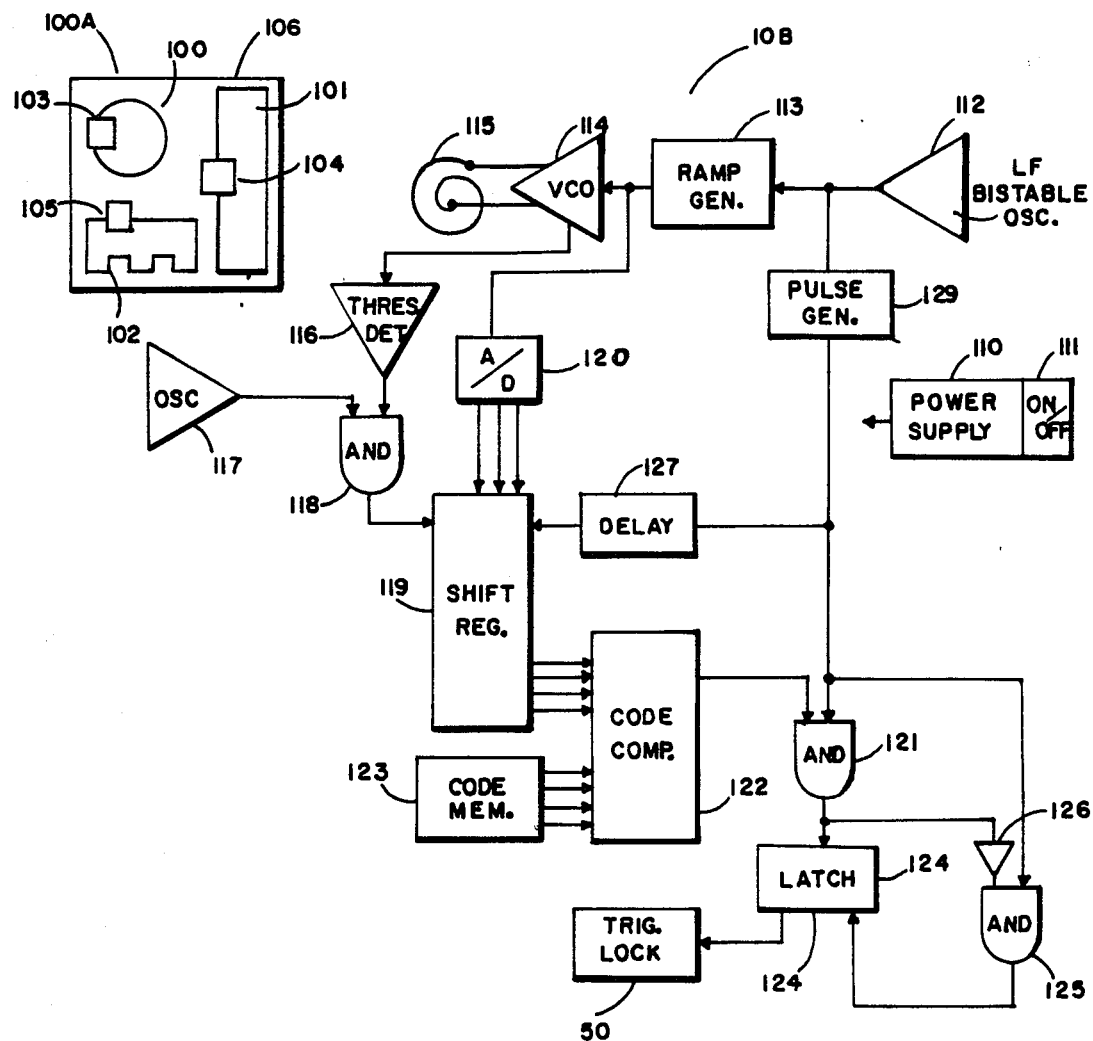

FIG. 6 is a schematic diagram showing further modifications and details of a hand weapon enabling system of the type defined and illustrated in FIGS. 2-3.

In FIG. 1 is shown components of a hand-held and operated bullet firing pistol which is electronically controlled or is enabled to operate by means of electronics including an enabling circuit supported within the pistol which is activated when a nearby electrical or electronic device, preferably supported by a wrist band, watch or finger ring, is worn or held by the person seeking to operate the weapon. The combination of enabling circuit or circuits and enabling device which is sensed as well as the weapon itself defines a weapon or tool system 10. Such system 10 may also be employed to enable the operation of certain hazardous hand tools as well as control devices for machinery, the operation of motors, valves, measuring or detecting instruments, or manually operated means for effecting such hazardous operations as the detonation of explosives, the activation of a high voltage source of energy, the operation or activation of a high intensity laser or electron beam generating device, etc.

In FIG. 1, a finger ring 11 is shown which contains a first electrical or electronic system 10A, which is illustrated in greater detail in FIG. 2 and which serves as an enabling circuit for a hand-held device, such as a pistol 13 or other hand operated instrument. The pistol 13 may, of course, compose any form of firearm or device which may be hazardous to operate or cause injury if operated improperly by an untrained or unauthorized person.

The support or ring 11 for subsystem 10A is shown containing a housing 12 in which suitable electronics or energy field alternating means is located. The pistol 13 contains supported within its handle 14 an electronic subsystem denoted 10B which, when properly activated when in the vicinity of subsystem 10A enables the pistol trigger 16 to be properly operated in discharging the pistol or operating its mechanism. Subsystem 10B may, of course, be supported adjacent the handle in the rear portion of the barrel or immediately adjacent the trigger mechanism under the barrel.

In FIG. 2 is shown electronic components of a first enabling system 10 including a battery power supply 18 and suitable means for indicating the condition of the battery (not shown). Notation 15, FIG. 1 refers to a conventional locking pin for the trigger 16 of the pistol. When such pin is depressed to its unlocking position, the trigger of the pistol is still maintained disabled or unable to discharge the weapon unless a suitable subsystem, such as 10A, is in the immediate vicinity of the pistol or tool mounted subsystem 10B.

A normally open switch 17, which may comprise a mechanical switch activated to close when the pistol handle 14 is grasped or when the trigger 16 of the pistol is partially depressed and permits operating current to flow from battery 18 to a code generating microelectronic circuit 19 provided on a microchip. The code so generated is passed to a short wave transmitter 20 which may be supported on the same chip and is connected to an antenna 21, all of which components may be supported within the crown of the ring or a common support within a watch housing or wristband. The code so generated is transmitted over a short distance to a receiving antenna 22 supported within or on the weapon or device 13, the output of which is applied to a detector 23 which is connected to a filter 24, such as a capacitor, resulting in a direct current being generated which activates a decoder 25. The decoder 25 provides a true operating signal to a transmission gate 26 when detector 23 detects the proper code and allows the transmission gate 26 to transfer operating power passed through the filter 24 to the input of a trigger lock mechanism 50, which includes a motor or solenoid which is operated thereby and enables the trigger to be pulled or pivoted by hand to an operating position. As a result, the trigger 16 may only be operated to discharge the weapon or operate the device 13 or pistol 13 when enabling circuit 10A is in the immediate vicinity of the antenna 22 for the enabling subsystem 10B.

In FIG. 3 is shown a modified form of the system 10 having a subsystem containing its own power supply 27, supported within the weapon or device to be controlled and enabled to operate when the detectable electronic subsystem 10A is in the vicinity of a receiving antenna 22. As in FIG. 2, receiving antenna 22 passes signals received thereby to a detector 23, the output of which is connected to a filter 24 which is connected to a decoder 25 and all such units operate as previously described. When a proper coded signal is sensed by the decoder 25, it activates a transmission gate 28 which, when so activated, allows current to flow from the battery 27 to a motor or solenoid in the trigger lock subsystem 50 which conditions the weapon or device to permit it to be manually operated or discharged.

In a third embodiment illustrated in FIG. 4, operating current is provided solely in a subsystem 10D supported by the weapon or hand-held device to be controlled or enabled to operate. Power supply or battery 27 supplies operating current to a short wave transmitter 29 which is operable to radiate a radio frequency signal on an antenna 30. Such radiated signal generates an RF signal in the immediate vicinity of the antenna, which field is picked up by a receiving antenna 31, forming part of a subsystem 10E which is supported within a finger ring housing, watch housing or other device supported on or by the body or limb of the person who is authorized to use the weapon or hand-held device. The output of antenna 31 is connected to a detector 32 for the received signal and the output of the detector is passed to a filter 33, such as a capacitor, which generates on its output a direct current signal which is applied to both drive a code generator 34 and a short wave transmitter 35. When the code generator 34 is so activated, it generates a unique code which is short wave transmitted on an antenna 36 to a receiving antenna 37 which is supported by the weapon or device being controlled. Electrical signals generated on the output of the receiving antenna 37 are passed to a detector 38, filtered by a filter 39 and applied as operational power to a decoder 40. When the proper code is detected by the decoder 40, a true signal is transferred to a transmission gate 41, which then transfers suitable operating power from filter 39 to activate the trigger unlocking mechanism in the trigger lock or subsystem 50, thereby allowing proper operation of the weapon or pistol 13 by permitting the trigger thereof to be fully depressed or pulled to discharge the weapon.

In FIG. 5 is shown further details of a hand weapon, such as a pistol 51, similar in construction to the hand weapon illustrated in FIG. 1 and containing an enabling device in the form of a monostable solenoid or motor which is preferably spring biased to normally prevent the operation of the weapon.

The weapon 51 includes a handle portion 51H, preferably made of a metal casing or molding and having a plurality of integrally cast or molded partitions or lug portions denoted 52, 56, 71, etc. formed therein for retaining an electronic package 74, rechargeable battery 75 and a monostable solenoid 69 containing an output shaft 70. Access to such components supported within the handle 51H may be had when the halves of the casting or molding forming the handle or stock 51H and an upper portion 57 which contains the trigger mechanism and a multi-cartridge barrel 57B rotationally supported thereby are disassembled. Wires or connectors 53 extend between the rechargeable battery 75 at the bottom of the handle or stock 51H to respective inputs of the electronic package 74 and wires or cables 73 extend through opening 72 in partition 71 to the energizing input of the solenoid 69 so that proper detection of a coded device, such as ring 10A of FIG. 1, when it is in the vicinity of the weapon 51, will result in the passage of suitable electrical energy to operate the solenoid as described and to retract the shaft 70 thereof, which is normally held extended as illustrated, to permit the trigger mechanism to operate and to discharge a missile or bullet from the barrel 58.

The trigger mechanism includes a finger operated trigger 60 protected by a finger guard 59 and pivotally supported near the bottom of the housing 57 to permit it to be pulled by finger and to discharge the weapon when the solenoid shaft 70 is properly retracted. Pivotally supported in a slotted opening (not shown) in the trigger 60 is a first yoke portion 63 at one end of a shaft 65 containing a second yoke portion 66 at the other end thereof into which second yoke portion 66 protrudes the shaft 70 of the solenoid 69 when the trigger 60 is released. A coil spring 67 may supplement the conventional trigger spring (not shown) to normally retain the trigger extended in the position illustrated and prior to firing the weapon, so that the shaft 70 of the solenoid will project between the leaves of the yoke 66 as illustrated and against the base thereof so as to prevent the trigger from being pulled or operated. When shaft 70 is retracted by the means described and illustrated in FIGS. 2-4, the trigger may be pulled permitting a cylindrical slide portion 64 of the shaft 65 to slidably move rearwardly along a guideway 68 supported between or formed of the left and right side sections of the housing 57.

The solenoid 69 may be otherwise disposed than illustrated in FIG. 5 and the mechanism which it engages and prevents movement of when the trigger is pulled and the solenoid is deactivated, is also subject to variations other than that illustrated. For example, the entire mechanism may be supported within the housing 57 and slidably operate or pivot in a direction other than parallel to the axis of the barrel 58 of the gun. The solenoid 69 may also be replaced by an electric motor or other device or a solenoid connected to operate a trigger enabling mechanism when the shaft of the solenoid is extended from a normally retracted position.

Notation 55 refers to a plurality of openings in the bottom wall 54 of the handle 51H, into which openings may be inserted a male connector for providing charging electrical current for the rechargeable battery 75 located at the bottom of the handle. A small electric lamp or other device, supported by a wall of the handle 51H, such as the bottom wall 54 thereof, may be employed to indicate when the battery 75 is discharged or approaching a discharge condition and such device may be operated by a switch which is closed, for example, when the trigger is partially depressed. A conventional safety lock may also be employed to prevent discharge of the weapon.

A mechanism similar to or operable in a similar manner to that illustrated in FIG. 5, may also be employed in other forms of weapons such as rifles, machine guns, grenade launchers, heavy guns, laser weapons, and a variety of hand or machine tools which are normally prevented in their operation and only enabled to be operated by means of a finger operated trigger or other device when a coded circuit or coded array of miniature antennas or inductors, as described, is disposed in the vicinity of the operating mechanism thereof.

In FIG. 6 is shown a modified form of the invention in which the finger ring 11 provides a sub-system 100A containing passive tuned circuits which are composed of inductors denoted 100, 101 and 102 of various circuit patterns, each of which has a parallel connected capacitance denoted 103, 104 and 105, thus forming three independent resonant circuits. A combination of these three resonant circuits, or any number of such different resonant circuits, defines a unique code which may be designed to define a selected inductance-capacitance circuit unique to a particular user or owner of a weapon, a group of weapons or for use by a particular group of individuals. Such circuits may be mounted on a suitable substrate 106, which may comprise a chip of ceramic, plastic or other material containing deposited or etched metal circuit patterns and supported within or on a finger ring, as described above, or a wrist band.

In the version of the system illustrated in FIG. 6, a gun mounted sub-system 10B is battery operated by a power supply 110 containing an on-off switch 111 which supplies electrical energy from such power supply to the control circuits illustrated, which define the sub-system 10B.

During the operation of the sub-system 10B, a low frequency bi-stable multivibrator oscillator 112 provides a continuous square wave signal to a ramp generator 113 which produces a linear ramp voltage wave form on its output. Such ramp voltage is used to scan a voltage controlled oscillator 114 across its operational frequency range. The output of the oscillator 114 feeds a loop antenna 115 which radiates radio frequency energy at the frequency of the oscillator. Such radiated energy or signals are picked up by the tuned circuits of the sub-system 10A and, when voltage controlled oscillator 114 is scanned across the resonant frequency of one of the tuned circuits, energy is efficiently transferred to the tuned circuit if the sub-system 10A is within the operational range of sub-system 10B. Such energy transfer is reflected at the oscillator 114 as a change in the current consumption of the circuit thereof. If the oscillator 114 is defined, for example, by a field effect transistor, a dip in source current results and the change in the current consumption of the voltage controlled oscillator 114 is greater than a preset threshold and is sensed by a threshold detector 116, the output of which, when coincident with an output post from a high frequency multivibrator 117, forms a clock pulse for a shift register 119, having a serial parallel output, through an AND gate 118. The digital output of an analog-to-digital convertor 120, defines a digitally coded representation of the voltage output of the ramp generator 113 and thus represents the frequency of the oscillator 114. Thus, when the frequency of the oscillator 114 coincides with the resonant frequency of one or more of the circuits of the sub-system 10A, a clock pulse is generated on the input to the shift register 119 causing the signals from the analog-to-digital converter 120 to be stored in sequential order in the shift register 119.

When an entire frequency sweep is completed, such as when the voltage ramp has reached its maximum value, and the oscillator 120 toggles, a pulse generator 129 outputs a pulse, which is indicative of such condition, which pulse is transmitted to an AND gate 121. A code comparator 122 receives the parallel code signals from the shift register 119 and, if coincidence or a match occurs between the accumulated code in the shift regiater 119 and the code generated by a pre-programmed memory 123, such as a RAN, the AND gate 121 transfers the pulse output of the gate 129 to the set-input of a latch 124, thus setting the latch and, in turn, retracting the trigger lock mechanism 50 to permit the weapon to be operated.

If, on the other hand, such a code match between the outputs of the memory 123 and the shift register 119, does not occur, the AND gate 121 does not transfer such control pulse to the latch 124. Instead, the pulse output by pulse generator 129 is transferred through an AND gate 125, the other input of which is held true by an invertor 126, so as to energize the reset input of latch 124. Thus latch 124 is reset during each cycle in which no code match occurs and the trigger lock mechanism 50 is retained in a locked position preventing operation of the weapon by locking or holding the finger operated trigger from operating.

After an appropriate time interval for the latch 124 to set, the pulse output of generator 129 is also transferred to a clear-input of shift register 119, to a time delay circuit 127. Such operational sequence is repeated for each cycle of the oscillator 112 as long as the switch 111 is closed.

In the embodiments of the invention illustrated in FIGS. 2-6, the enabling electrical signals passed to the so-called trigger locks 50 may be operable to momentarily close a normally open monostable switch which connects a source of electrical energy such as the described batteries or power supplies to the solenoid or motor which drives the trigger lock mechanism to an unlocking or enabling condition. A single source of electrical energy for powering the electrical circuits in the gun or device being enabled to operated may thus be employed to both effect detection of the code or signal generated by the wrist or finger mounted device and power operate the solenoid or motor driving the trigger lock mechanism to an enabling state after which it returns to the disabling condition when the trigger is released or the weapon is discharged.

Further improvements and modifications to the invention described are noted as follows:

I. Rather than form part of and be assembled with the weapon or machine device being controlled in its operation, the power supply may be supported by the finger ring or wrist band of a person operating the device and may be operable to generate sufficient radiant energy in the vicinity of the weapon or device being controlled, to provide operating current for the solenoid or motor or the device when such energy is detected by a suitable detector and converted to electrical energy.

II. A safety indicating device, such as a small lamp or light bulb, may be supported by the housing 57 and energized by electrical energy from the battery 75 when a switch is closed, such as a switch which is operable by pulling the trigger of the weapon a slight degree but not enough to discharge the weapon such as when the solenoid or motor normally prevents the operation of the weapon. Such switch, when so closed, may directly connect the battery with the indicating device so as to indicate by energizing such device, that the battery contains sufficient electrical energy to enable operation of the weapon as described.

III. The trigger mechanism employed to discharge the weapon may be so designed as to be enabled to partially operate or cock when the retaining device, such as the shaft of the solenoid, is retracted or operated in a manner to enable full operation of the weapon so that a person, containing a coded circuit as described, supported by his hand, wrist or body, may check his system to determine that the weapon may be properly operated without actually operating or discharging the weapon.

IV. If it is desired to permit the weapon to be operated without placing an enabling circuit in the vicinity thereof, the disabling device or stop mechanism may be designed to be mechanically retracted or moved when a special tool is inserted through an opening in the handle or housing of the weapon, thereby preventing operation of the weapon when such tool is not so inserted such as when the weapon is in storage. Such tool may comprise a simple pin or other device such as a key or wrench which is adapted to be manually operated to displace, turn or otherwise move the trigger stop mechanism while such tool is present or after the tool is removed from the weapon.

V. As a replacement or substitute for the battery mounted in the hand weapon, a mechanism, such as a magneto or inductance for generating electrical energy for powering the described electrical circuits and the solenoid enabling operation of the weapon when current is generated thereby, an action which may be effected when the trigger of the weapon is manually actuated or pulled wherein the spring which drives the hammer of the gun also drives the current generating magneto.

VI. Another replacement for the battery in the gun may comprise a piezoelectric spark pump operable to be compressed and to generate electrical energy for the purposes described when the trigger of the gun is actuated and operates such spark pump. Suitable electrical circuit means is provided to convert the high voltage spark energy to electrical energy for using in energizing the electronic ciruits described as well as the solenoid.

VII. The energy field modifying and detecting means described may be replaced by a passive microelectronic circuit supported by a chip substrate and containing an electrical energy generating means such as a microminiature induction coil for powering a tone or code generator on the chip and a short wave transmitter of such tone or code to transmit a short wave signal thereof to a short wave receiver in the weapon which it receives when such chip and its antenna are immediately adjacent the gun. A magnetic field generated by a moving coil or sudden energization of such a coil in the gun when the trigger is pulled, may be employed to provide induction magnetic energy to energize the induction coil of the ring or wrist mounted device and cause such electrical energy to be generated thereby for powering the tone or code generating and short wave transmitting circuit of the ring or wrist mounted device and a similar induction coil for generating electrical energy for powering the short wave receiver of the gun and the solenoid or motor thereof may be mounted in the gun and may be so energized by a mechanism actuated when the trigger of the gun is actuated or pulled.

VIII. A magnetic field generated by a permanent magnet supported in the finger ring or wrist mounted housing, may be employed when positioned adjacent the gun when the hand supporting same engages the gun, which field is detectable by a sensor in the gun which is activated with electrical energy generated momentarily when the trigger is actuated, such as by induction means mounted in the gun wherein such detection is operable to generate a control signal for closing a normally open switch between a battery or other source of electrical energy for powering the described enabling solenoid or motor.

IX. Infra-red or other form of light energy per se or coded and generated by a light source in the finger ring actiavated by induced electrical energy generated by a magnetic field emenating from the gun, may be picked up by a detector in the gun energized by induction energy when the trigger is pulled to provide such described enabling signal.

I claim:

1. Control system for a hand operated weapon comprising in combination with a hand weapon including finger operated means for activating said weapon, first means for normally preventing the operation of said weapon, said first means being operable from a first position preventing operation of said weapon to a second position whereby it enables the operation of said weapon, electro-mechanical means supported by said weapon for operating said first means to move said first means to enable operation of said weapon when said finger operated means activates said weapon, second means including a source of electrical energy, electronic control means and means for generating an energy field in the vicinity of said weapon, said second means being supported by said weapon, said electronic control means being operable, when activated, to permit electrical energy from said source to operate said electro-mechanical means to enable said hand weapon to be operated, third means supported by a person manually engaging said hand weapon for causing activation of said electronic control means when said weapon is operatively engaged by said person so as to cause said electro-mechanical means to be activated enabling said hand weapon to be operated by said person, said third means including means for altering the energy field generated by said second means, said second means including means for detecting when said energy field is altered by said third means, a normally open switch located between said source of electrical energy and said electro-mechanical means and means for generating a control signal upon detecting when said energy field is altered by the presence of said third means, means for applying said control signal to the switching input of said normally open switch so as to effect its closure and to enable energy from said source of electrical energy to pass to and actuate said electro-mechanical means so as to enable said hand weapon to be operated.

2. A control system in accordance with claim 1 wherein said weapon comprises a hand gun including a pistol grip, a barrel and a trigger for manually discharging said weapon, said second means being supported within said pistol grip of said hand gun.

3. A method of controlling the operation of a weapon comprising:

disposing a disenabling means within a weapon for normally preventing its operation, providing electrical circuit means for operating said disenabling means to permit the operation thereafter of the weapon, generating an energy field in the vicinity of said weapon and, altering said energy field by means of a device supported by a person when such device is brought within the realm of said energy field, detecting when said energy field is altered by the device brought into its realm and generating a control signal, applying said control signal to said electrical circuit means and causing said electrical circuit means to operate said disenabling means to permit the operation thereafter of said weapon.

4. A method in accordance with claim 3 wherein said control signal is applied to cause a normally open switch to close to connect a source of electrical energy to operate an electro-mechanical means so as to enable the operation of said weapon.

* * * * *